(12) United States Patent
Seok et al.

(10) Patent No.: US 8,194,740 B2
(45) Date of Patent: Jun. 5, 2012

(54) APPARATUS AND METHOD FOR COMPRESSION-ENCODING MOVING PICTURE

(75) Inventors: Jin Wuk Seok, Daejeon (KR); Chang Sik Cho, Daejeon (KR); Jeong Woo Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1365 days.

(21) Appl. No.: 11/774,948

(22) Filed: Jul. 9, 2007

(65) Prior Publication Data

US 2008/0080616 A1 Apr. 3, 2008

(30) Foreign Application Priority Data

Sep. 29, 2006 (KR) .......................... 10-2006-0095244

(51) Int. Cl.
*H04N 7/12* (2006.01)
*H04N 11/02* (2006.01)
*H04N 11/04* (2006.01)

(52) U.S. Cl. .......... 375/240.15; 375/240.11; 375/240.17

(58) Field of Classification Search .................. None
See application file for complete search history.

(56) References Cited

U.S. PATENT DOCUMENTS

| | | | |
|---|---|---|---|
| 6,005,625 A | | 12/1999 | Yokoyama |
| 7,751,476 B2 * | | 7/2010 | Tanizawa et al. ........ 375/240.03 |
| 2003/0007563 A1 * | | 1/2003 | Ryu .......................... 375/240.13 |
| 2004/0131121 A1 | | 7/2004 | Dumitras et al. |
| 2005/0135484 A1 | | 6/2005 | Lee et al. |
| 2005/0276331 A1 | | 12/2005 | Lee et al. |
| 2006/0039470 A1 * | | 2/2006 | Kim et al. ................ 375/240.16 |

FOREIGN PATENT DOCUMENTS

| | | |
|---|---|---|
| EP | 1431917 | 6/2004 |
| KR | 1020040035139 | 4/2004 |
| KR | 1020040093604 | 11/2004 |
| KR | 1020050061762 | 6/2005 |
| KR | 1020060057993 | 5/2006 |
| WO | 2004/064398 A1 | 7/2004 |
| WO | WO2004/064414 | 7/2004 |

OTHER PUBLICATIONS

Paul Delogne et al; "Improved Interpolation, Motion Estimation, and Compensation for Interlaced Pictures"; IEEE Transactions on Image Processing,vol. 3. No. 5,Sep. 1994.
Chung J. Kuo et al; "Polynomial Search Algorithms for Motion Estimation"; IEEE Transactions on Circuits and Systems for Video Technology, vol. 10,No. 5,Aug. 2000.
Bede Liu et al; "New Fast Algorithms for the Estimation of Block Motion Vectors";IEEE Transactions on Circuits and Systems for Video Technology,vol.3,No. 2,Apr. 1993.

* cited by examiner

*Primary Examiner* — Nathan Flynn
*Assistant Examiner* — Trang Doan
(74) *Attorney, Agent, or Firm* — Ladas & Parry LLP

(57) ABSTRACT

Provided are an apparatus and method for compression-encoding a moving picture at high speed while minimizing image quality deterioration. In H.264 moving picture encoding, the apparatus and method perform rate-distortion optimization (RDO) indispensable for high-definition encoding by feedback prediction, and minimize the amount of discrete cosine transform (DCT)-inverse DCT (IDCT) calculation performed for RDO many times, thereby performing H.264 encoding at high speed.

19 Claims, 6 Drawing Sheets

APPARATUS AND METHOD FOR COMPRESSION-ENCODING MOVING PICTURE

CROSS-REFERENCE TO RELATED APPLICATION

This application claims priority to and the benefit of Korean Patent Application No. 2006-0095244, filed Sep. 29, 2006, the disclosure of which is incorporated herein by reference in its entirety.

BACKGROUND

1. Field of the Invention

The present invention relates to an apparatus for compression-encoding a moving picture on the basis of H.264, etc., and more particularly, to an apparatus and method for compression-encoding a moving picture directed to preventing image quality deterioration while minimizing the amount of calculation performed for rate-distortion optimization (RDO).

2. Discussion of Related Art

Digital image data is used in video conferencing, high-definition televisions (HDTVs), video-on-demand (VOD) receivers, moving picture experts group (MPEG) image-supporting personal computers, video game systems, digital ground wave broadcast receivers, digital satellite broadcast receivers, cable TVs (CATVs), and so on. However, characteristics of images and conversion of an analog signal into a digital signal yield a large amount of digital image data. Thus, the digital image data is not used as is but rather is compressed by an efficient compression method.

Three main compression methods are used to compress digital image data. These are a method of reducing temporal redundancy, a method of reducing spatial redundancy, and a compression method using stochastic properties of generation codes. A representative method of reducing temporal redundancy is a motion estimation and compensation method, which is used in most moving picture compression standards such as MPEG, H.263, etc.

The motion estimation and compensation method is used to search for the portion of a previous or next reference screen that is most similar to a particular portion of a current screen, and transmit only difference components between the two portions. In the motion estimation and compensation method, the more precisely motion vectors are searched for, the less difference component data there is to transmit, thus providing a way to efficiently reduce the amount of data. However, searching for the most similar portion of the previous or next screen requires a considerably long estimation time and a large amount of calculation.

An H.264 codec performs the search using a cost function based on RDO instead of using a conventional sum of absolute difference (SAD)-based method. The cost function employed in H.264 uses a rate-distortion (RD) cost calculated by adding the number of encoded coefficients multiplied by a Lagrangian multiplier to a conventional SAD value. Here, the number of encoded coefficients is replaced with a value proportional to a quantized coefficient and then multiplied by a fixed Lagrangian multiplier to determine a compensation cost in order to perform the search.

In order to simultaneously obtain high compression efficiency and high image quality, encoding is performed in 16×16 or 8×8 large block units in conventional moving picture encoding, but a mode having the lowest value among eight different block modes is selected in H.264 moving picture encoding.

However, in order to determine eight different block modes, various encoding operations as well as integer-pixel and sub-pixel searches all must be performed separately for each mode. Consequently, more calculations are required and more time is taken in comparison with a conventional moving picture encoding algorithm. In order to embody a moving picture encoding apparatus for an Internet protocol (IP)-TV, it is necessary to be able to reduce calculation time by minimizing calculations for determining a block mode without deteriorating image quality.

FIG. 1 is a block diagram showing the constitution of a general H.264 moving picture encoder. Among the blocks, a motion estimator comprises an integer-pixel estimator for estimating an integer-pixel-specific motion vector, and a sub-pixel estimator for estimating optimum half-pixel and quarter-pixel-specific motion vectors on the basis of the estimated integer-pixel-specific motion vector.

The illustrated conventional H.264 encoder comprises a motion estimation (ME) module 22, a motion compensation (MC) module 24, an intra mode estimation (IME) module 32, an intra prediction (IP) module 34, a de-quantization (IQ) module 58, an inverse discrete cosine transform (IDCT) module 56, an entropy encoding module 64, a deblocking filter 92, frame memories 12, 14 and 18, and so on.

The motion estimation module 22 performs a function of detecting a motion vector from several reference images and a macroblock mode determination function of searching for the optimum macroblock type having the minimum bit rate and errors. The motion compensation module 24 functions to obtain a compensation image from a reference image according to the motion vector and macroblock mode type detected by the motion estimation module 22. In FIG. 1, the motion compensation module 24 is limited to obtaining differences between two compared images, and the following process for obtaining a compensation image is resumed by a discrete cosine transform (DCT) block 52 and a quantization module 54.

In intra-coding of a macroblock, the intra mode estimation module 32 functions to select the optimum intra prediction mode by performing prediction on adjacent blocks. The intra prediction module 34 functions to obtain an intra-predicted compensation image from previously coded adjacent blocks using the selected intra prediction mode. The intra mode estimation module 32 performs a similar function to the motion estimation module 22 in inter mode and thus is referred to as a motion estimation module in intra mode. And, the intra prediction module 34 performs a similar function to the motion compensation module 24 in inter mode and thus is referred to as a motion compensation module in intra mode.

The DCT module 52 perfumes 4×4 DCT, the quantization module 54 quantizes coefficients transformed by the DCT 52, and the IDCT module 56 and the dequantization module 58 respectively perform the reverse of operations performed by the DCT module 52 and the quantization module 54.

The operation result Dn' of the IDCT module 56 is restored images that have not passed through the deblocking filter 92. The entropy encoding module 64 performs entropy coding using bit allocation based on the probability of the occurrence of quantized DCT coefficients. The deblocking filter module 92 functions to improve the quality of the restored images obtained through the IDCT module 56, and the improved-quality images are stored in the frame memory module 18 to be used as references for subsequently input images.

Unlike conventional MPEG-1, MPEG-2 and MPEG-4 standards, the H.264 standard has several reference images, and a plurality of previously encoded images as well as an immediately previous frame can be used as the reference images. This is called multiple reference frames.

Similar to the conventional MPEG standards, the H.264 standard performs encoding in slices including an I_slice, a P_slice, a B_slice, an SI_slice and an SP slice. For convenience of description, a slice can be regarded as a single frame. That is, the I_slice, the P_slice and the B_slice are almost the same as an I_picture, a P_picture and a B_picture of the conventional MPEG standards.

The H.264 standard defines an inter mode representing each macroblock making up currently input frame data by a moving vector and difference value with respect to previous frame data, and an intra mode representing each macroblock by a moving vector and a difference value with respect to the same frame data. According to macroblock size, P16×16, P16×8, P8×16, P8×8, P8×4, P4×8 and P4×4 modes exist in the inter mode, and I16×16 and I4×4 modes exist in the intra mode. An H.264 encoding apparatus selects a mode providing high compression efficiency due to a low cost.

Here, the method of selecting an optimal block mode is an RDO technique. A motion estimation and mode decision algorithm using RDO can improve a bit rate by 5 to 10% at a cost of 30 to 40% encoding speed.

Therefore, in general, the H.264 standard performs motion estimation and compensation for all the modes in the sequence illustrated in FIG. 2 (alternatively, an I16×16 mode may be processed after B-slice check), calculates compensation costs, and compares the calculated compensation costs to determine an optimum mode for received frame data.

FIG. 3 is a conceptual diagram illustrating an encoding process performed by an H.264 moving picture encoding apparatus using conventional RDO. All the blocks illustrated in FIG. 3 can be embodied as separate pieces of hardware, but this increases hardware load. Generally, at least two of blocks 1200 to 1700 for mode decision are embodied as sequential operations of one piece of hardware. In this sense, FIG. 3 is merely a conceptual diagram. In FIG. 3, a motion estimation block and a motion compensation block may have structures shown in FIGS. 4 and 5, and an encoding block 1100 may have the structure of the H.264 encoder shown in FIG. 1.

In FIG. 3, a B_slice check block 1200 is directed to calculating an estimation value in a skip mode processing a previous frame and a next frame by division blocks having the zero vector for a moving vector. Three inter mode prediction blocks 1300, 1400 and 1500 respectively operating according to P16×16, P16×8/P8×16 and P8×8 or less modes are directed to calculating inter mode-specific prediction bit values from the continuous parts of a moving picture. Two intra prediction blocks 1600 and 1700 respectively operating according to I16×16 and I4×4 modes are directed to calculating intra mode-specific prediction bit values from the non-continuous parts of a moving picture. Alternatively, the P8×8 mode may be further classified into P8×8, P8×4, P4×8 and P4×4 modes to be processed.

As illustrated in FIG. 3, in the moving picture encoding apparatus according to conventional art, with respect to input frame data, the 6 prediction bit calculators 1200 to 1700 calculate prediction bit values for 7 modes, respectively (the 16×8/8×16 mode integer-predictor calculates two prediction bit values for 16×8 and 8×16 modes).

A mode decision block 1900 examines the 7 prediction bit values and selects the most appropriate mode, and the final encoding block 1100 converts input frame data according to the determined mode.

It can be seen in FIGS. 3 to 5 that when the standard H.264 moving picture encoding apparatus shown in FIG. 1 uses RDO, RDO is substantially performed once per block mode. In addition, in motion estimation with respect to 5 reference images, RDO must be performed once per reference image, thus significantly increasing the amount of calculation for moving picture encoding.

When each block is embodied as a separate hardware module, hardware cost goes up. On the other hand, when the blocks are embodied in one hardware module for prediction value calculation, the hardware module performs predicted value calculation 8 times (once for each of the 7 modes and once for a determined mode). Consequently, it can be seen that the amount of calculation for moving picture encoding is considerably large.

SUMMARY OF THE INVENTION

The present invention is directed to an apparatus and method for compression-encoding a moving picture, capable of minimizing the amount of calculation while efficiently performing rate-distortion optimization (RDO) during moving picture compression-encoding operation.

One aspect of the present invention provides an apparatus for compression-encoding a moving picture, comprising: a B-slice checker for performing a B-slice check for current frame data; a maximum inter mode prediction bit calculator for performing motion estimation and motion compensation for an inter mode using the maximum division block and calculating a prediction bit value; a minimum intra mode prediction bit calculator for performing motion estimation and motion compensation for an intra mode using the minimum division block and calculating a prediction bit value; a linear prediction bit estimator for calculating prediction bit values for modes other than the inter mode using the maximum division block and the intra mode using the minimum division block, using linear parameters and stochastic values; a mode determiner for comparing the prediction bit values calculated by the maximum inter mode prediction bit calculator, the minimum intra mode prediction bit calculator and the linear prediction bit estimator, and determining an appropriate encoding mode; and an encoder for encoding the current frame data in the mode determined by the mode determiner.

Another aspect of the present invention provides a method of compression-encoding a moving picture, comprising the steps of: (a) performing a B-slice check for input current frame data; (b) performing motion estimation and motion compensation for an inter mode using the maximum division block, and calculating a prediction bit value; (c) performing motion estimation for inter modes other than the mode using the maximum division block and intra modes other than a mode using the minimum division block; (d) applying linear parameters to the motion estimation result of step (c) and calculating mode-specific prediction bit values; (f) performing motion estimation and motion compensation for the intra mode using the minimum division block and calculating a linear prediction bit value; (g) comparing the linear prediction bit values with each other and determining the optimum mode; and (h) encoding the current frame data in the determined optimum mode.

Thus far, in order to perform RDO, a motion estimation (ME) process and a motion compensation (MC) process have been performed for all the selectable block modes, thus requiring a large amount of calculation and a lengthy calculation time.

In contrast, the present invention includes a separate rate-distortion (RD) estimator capable of easily estimating an RD value by calculation employing a linear parameter which is updated in real time through a feedback process.

When such a method is used, a motion compensation process is unnecessary in a compensation cost calculation process for most block modes other than an inter mode of the maximum division block and an intra mode of the minimum division block. Consequently, it is possible to remarkably reduce the amount of calculation.

BRIEF DESCRIPTION OF THE DRAWINGS

The above and other objects, features and advantages of the present invention will become more apparent to those of ordinary skill in the art by describing in detail preferred embodiments thereof with reference to the attached drawings in which.

DETAILED DESCRIPTION OF EXEMPLARY EMBODIMENTS

Hereinafter, exemplary embodiments of the present invention will be described in detail. However, the present invention is not limited to the embodiments disclosed below, but can be implemented in various forms. The following embodiments are described in order for this disclosure to be complete and enabling of practice of the present invention by those of ordinary skill in the art.

In this exemplary embodiment, an H.264 encoding apparatus employing a feedback structure for fast encoding according to the present invention will be described in detail. Therefore, in this exemplary embodiment conforming to the H.264 standard, an inter mode of the maximum division block is a P16×16 mode, an intra mode of the minimum division block is an I4×4 mode, and a compensation cost is a rate-distortion (RD) value.

Figure 1:
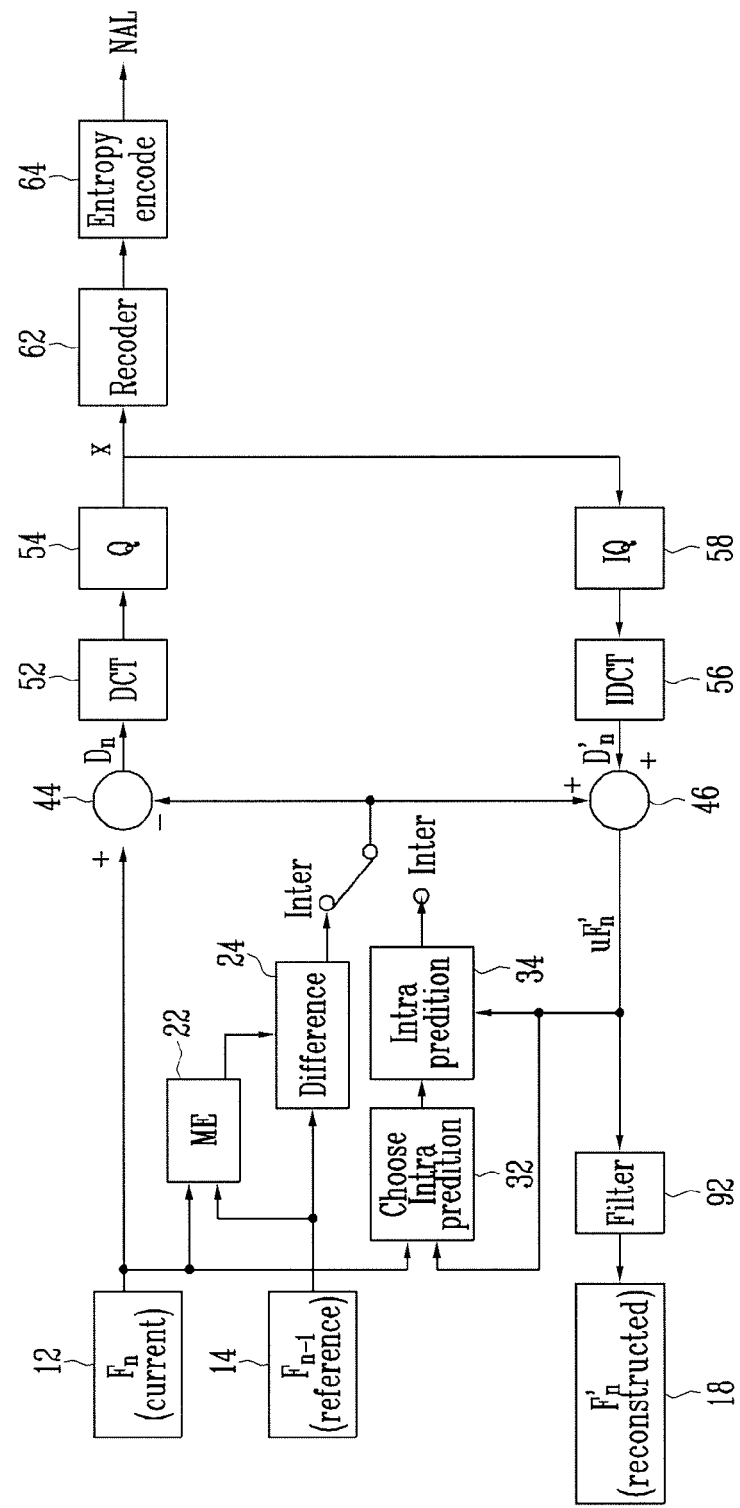
FIG. 1 is a block diagram showing the constitution of a general H.264 encoder.
Figure 2:
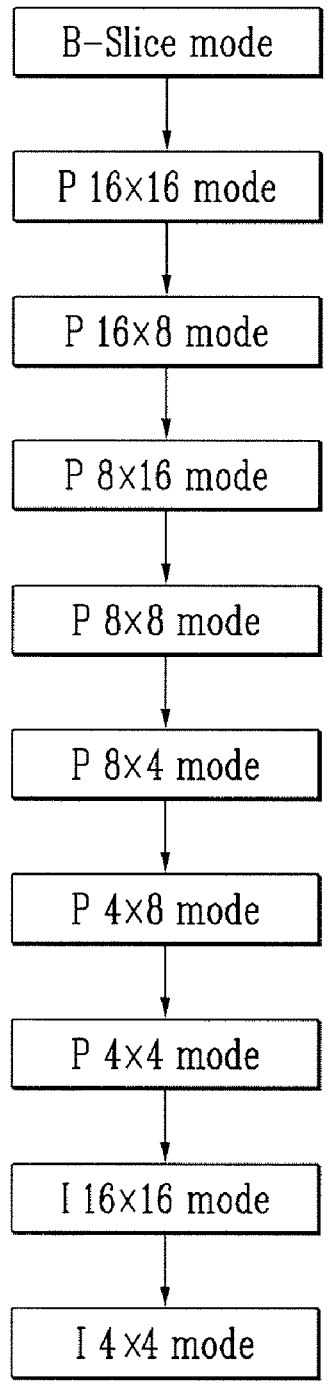
FIG. 2 is a flowchart showing the sequence of determining mode-specific prediction values according to a general H.264 moving picture encoding method.
Figure 3:
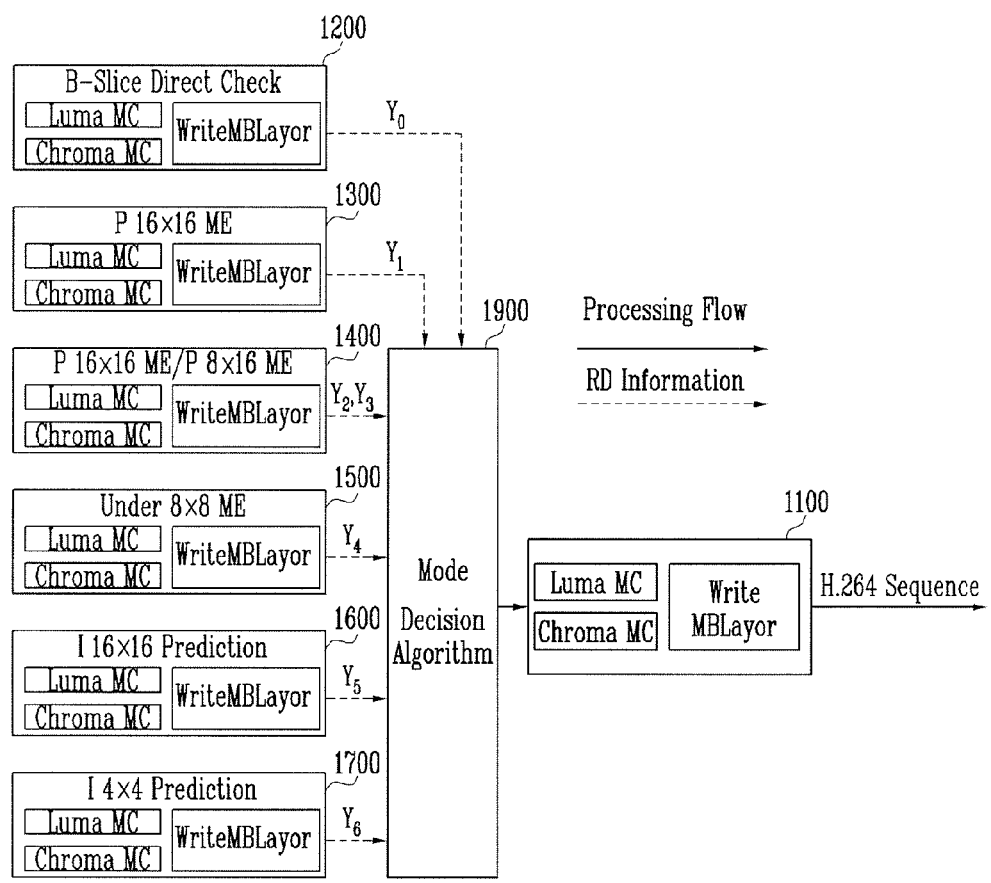
FIG. 3 is a conceptual diagram illustrating an H.264 moving picture compression-encoding method according to conventional art.
Figure 4:
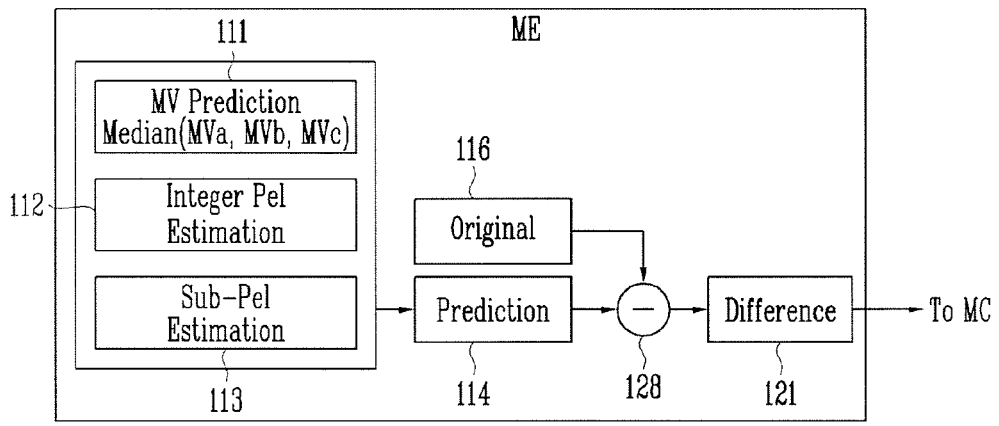
FIG. 4 is a block diagram showing the detailed constitution of a motion estimator among the components of a general H.264 moving picture compression-en-coding apparatus.
Figure 5:
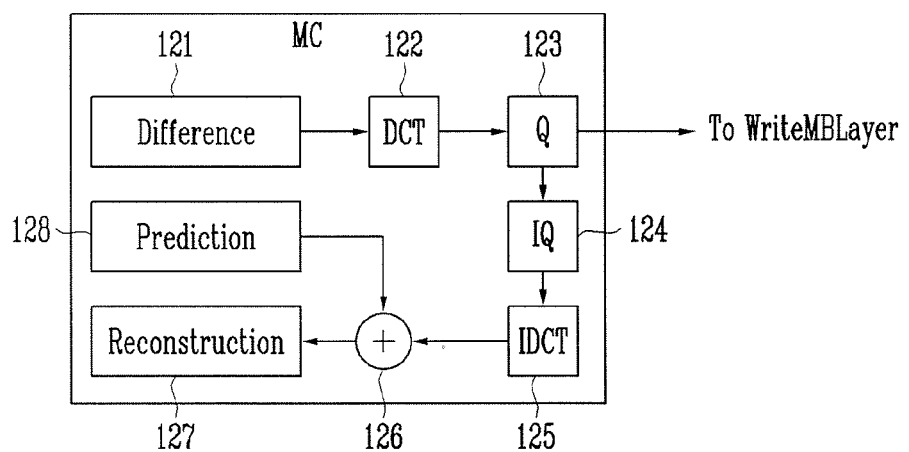
FIG. 5 is a block diagram showing the detailed constitution of a motion compensator among the components of a general H.264 moving picture compression-encoding apparatus.
Figure 6:
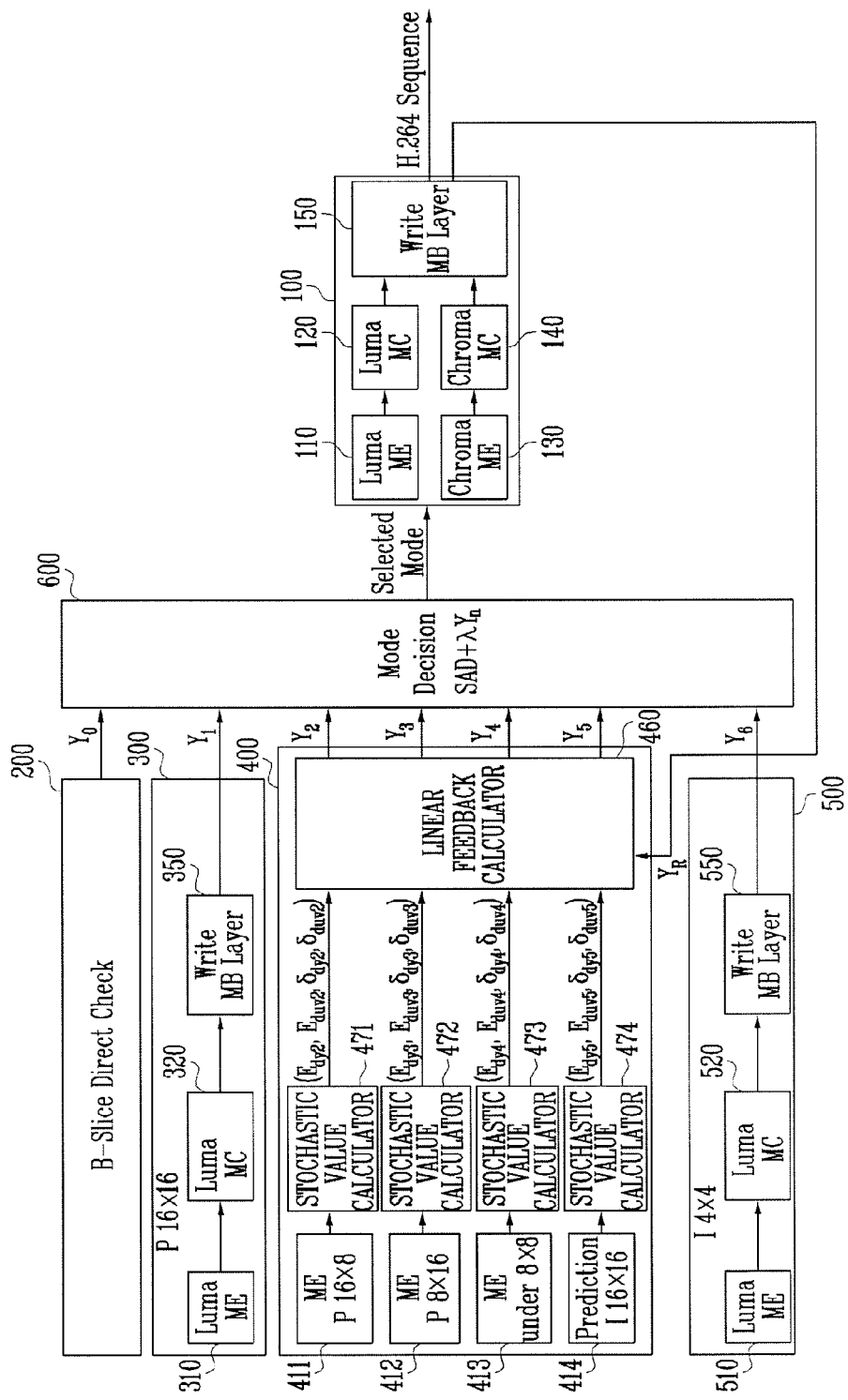
FIG. 6 is a block diagram showing the constitution of an H.264 moving picture compression-encoding apparatus according to an exemplary embodiment of the present invention.

FIG. 6 illustrates the constitution of an H.264 moving picture compression-encoding apparatus according to an exemplary embodiment of the present invention. The moving picture compression-encoding apparatus of this exemplary embodiment comprises a B-slice checker 200, a maximum inter mode prediction bit calculator 300, a minimum intra mode prediction bit calculator 500, a linear prediction bit estimator 400, a mode determiner 600, and an H.264 encoder 100. The B-slice checker 200 performs a B-slice check for current frame data. The maximum inter mode prediction bit calculator 300 performs motion estimation (ME) and motion compensation (MC) for a P16×16 mode and calculates a prediction bit value. The minimum intra mode prediction bit calculator 500 performs estimation and compensation for pixels in the same frame in an I4×4 mode and calculates a compensation cost. The linear prediction bit estimator 400 calculates prediction bit values with respect to modes other than the P16×16 mode and the I4×4 mode using linear parameters and stochastic values. The mode determiner 600 compares prediction bit values $Y_0$ to $Y_6$ calculated by the maximum inter mode prediction bit calculator 300, the minimum intra mode prediction bit calculator 500 and the linear prediction bit estimator 400, and determines an appropriate encoding mode. The H.264 encoder 100 encodes the current frame data in the mode determined by the mode determiner 600.

The B-slice checker 200 may be a conventional kind, but, in order to reduce hardware load, may calculate the prediction bit value $Y_0$ by performing a B-slice check for only luminance component data.

Likewise, the maximum inter mode prediction bit calculator 300 and the minimum intra mode prediction bit calculator 500 may be the same as in the conventional art, but, in order to reduce the hardware load, may perform motion estimation, motion compensation and compensation cost calculation for only luminance component data. In this case, the maximum inter mode prediction bit calculator 300 and the minimum intra mode prediction bit calculator 500 may comprise luminance motion estimators 310 and 510, luminance motion compensators 320 and 520, and writers 350 and 550, respectively. Here, the writers 350 and 550 output not an encoding sequence but the linear prediction values $Y_1$ and $Y_6$ only, unlike a writer 150 of the encoder 100.

The linear prediction bit estimator 400 comprises a first motion estimator 411, a first stochastic value calculator 471, a second motion estimator 412, a second stochastic value calculator 472, a third motion estimator 413, a third stochastic value calculator 473, and a linear feedback calculator 460. The first motion estimator 411 performs motion estimation for an inter I6×8 mode. The first stochastic value calculator 471 calculates a stochastic vector ($E_{dY2}$, $E_{dUV2}$, $\sigma_{dY2}$, $\sigma_{dUV2}$) required for linear prediction value estimation using values obtained by the first motion estimator 411. The second motion estimator 412 performs motion estimation for an inter 8×16 mode. The second stochastic value calculator 472 calculates a stochastic vector ($E_{dY3}$, $E_{dUV3}$, $\sigma_{dY3}$, $\sigma_{dUV3}$) required for linear prediction value estimation using values obtained by the second motion estimator 412. The third motion estimator 413 performs motion estimation for inter 8×8 or less modes. The third stochastic value calculator 473 calculates a stochastic vector ($E_{dY4}$, $E_{dUV4}$, $\sigma_{dY4}$, $\sigma_{dUV4}$) required for linear prediction value estimation using values obtained by the third motion estimator 413. The linear feedback calculator 460 respectively applies linear parameters to four stochastic vectors ($E_{dY2}$, $E_{dUV2}$, $\sigma_{dY2}$, $\sigma_{dUV2}$), ($E_{dY3}$, $E_{dUV3}$, $\sigma_{dY3}$, $\sigma_{dUV3}$), ($E_{dY4}$, $E_{dUV4}$, $\sigma_{dY4}$, $\sigma_{dUV4}$) and ($E_{dY5}$, $E_{dUV5}$, $\sigma_{dY5}$, $\sigma_{dUV5}$) and calculates linear prediction values according to Formula 1 given below.

Figure 7:
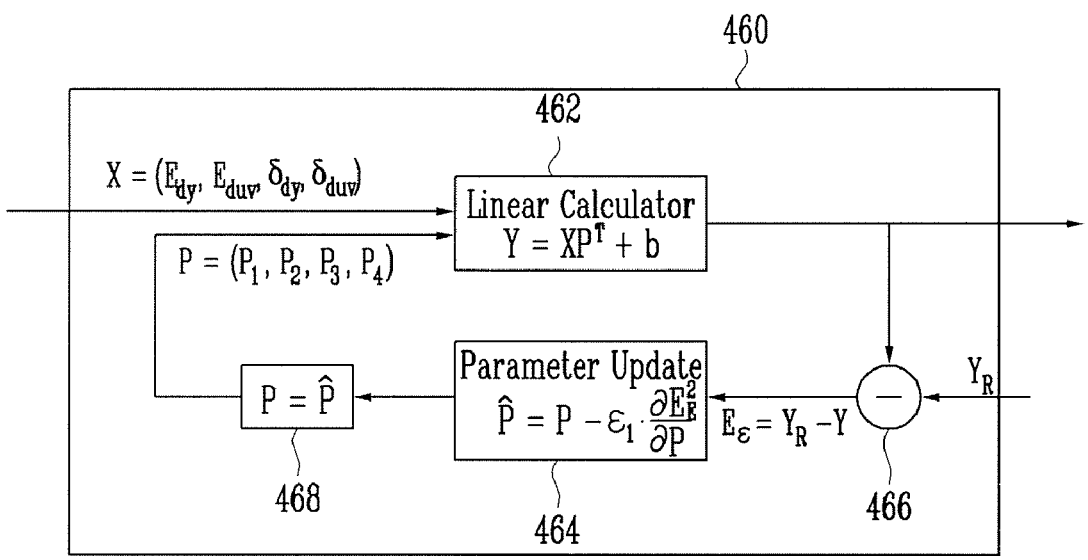
FIG. 7 is a block diagram showing the constitution of a linear feedback calculator among the components of the H.264 moving picture compression-encoding apparatus of FIG. 6.

As illustrated in FIG. 7, the linear feedback calculator 460 comprises a linear calculator 462, a subtracter 466, a parameter updater 464, and a parameter storage 468. The linear calculator 462 calculates a linear prediction bit value Y using a linear parameter P, the average and variance of luminance errors, and the average and variance of chrominance errors ($X = (E_{dY}, E_{dUV}, \sigma_{dY}, \sigma_{dUV})$). The subtracter 466 calculates an error $E_\epsilon$ between the calculated linear prediction bit value Y and an actual linear prediction bit value $Y_r$ output from the encoder 100 of FIG. 6. The parameter updater 464 calculates an update value $\hat{P}$ of the linear parameter using the error $E_\epsilon$ between the linear prediction bit values. The parameter storage 468 stores the updated parameter $\hat{P}$.

Meanwhile, it is illustrated in FIG. 6 that stochastic value calculators 471 to 474 are respectively prepared for the modes. However, since the calculation is rather simple, stochastic vectors with respect to 4 modes may be calculated in sequence by one stochastic value calculator. On the other hand, the linear feedback calculator 460 is illustrated as one module in FIG. 6 but may also be embodied as several modules separately prepared for each mode.

The mode determiner 600 receives the 7 linear prediction values $Y_0$ to $Y_6$, applies each of them to Formula 4 given below to calculate an RD value, and selects a mode having the minimum cost (RD value).

An encoding method performed by the moving picture compression-encoding apparatus constituted as described above according to this embodiment comprises the steps of: (a) performing a B-slice check for input current frame data; (b) performing motion estimation and motion compensation for an inter mode (P16×16 in H.264) using the maximum division block, and calculating a prediction bit value; (c) performing motion estimation for inter modes other than the mode using the maximum division block and intra modes other than a mode using the minimum division block; (d) applying linear parameters to the motion estimation result of step (c) and calculating mode-specific prediction bit values; (f) performing motion estimation and motion compensation for the intra mode (I4×4 in H.264) using the minimum division block and calculating a linear prediction bit value; (g) comparing the linear prediction bit values with each other and determining the optimum mode; and (h) encoding the current frame data in the determined optimum mode.

Step (a) is performed by the B-slice checker 200 of FIG. 6. Step (a) may be performed according to conventional art, but, in order to further reduce the amount of calculation, may be implemented to perform a B-slice check for only luminance component data among the current frame data.

Step (b) is performed by the maximum inter mode prediction bit calculator 300 of FIG. 6. In step (b), motion estimation is performed, and the corresponding macroblock data is discrete cosine transform (DCT)-converted and quantized according to a motion estimation value. In order to further reduce the amount of calculation, a compensation cost with respect to the inter mode using the maximum division block may be calculated by performing motion estimation and motion compensation only for a luminance frame formed according to luminance component pixel values and not for a chrominance frame formed according to chrominance component pixel values.

Steps (c) to (g) are main parts of the present invention performed by the linear prediction bit estimator 400 of FIG. 6. In step (c), motion estimation between a reference frame and a current frame is performed for each inter mode (16×8, 8×16, 8×8, 8×4, 4×8, 4×4 in H.264), and motion estimation between pixel values in the same frame is performed for each intra mode (16×16 in H.264).

Step (d) comprises the sub-steps of (d1) calculating mode-specific averages and variances of luminance errors and mode-specific averages and variances of chrominance errors from mode-specific motion estimation results of step (c), and (d2) calculating mode-specific linear prediction bit values using mode-specific linear parameters, the mode-specific averages and variances of luminance errors, and the mode-specific averages and variances of chrominance errors.

In step (d2), the mode-specific prediction bit values are calculated by Formula 1 given below. In step (g), the mode-specific prediction bit values calculated in step (d2) are applied to Formula 2 given below so that mode-specific prediction bit values of step (c) may be calculated.

Step (f) is performed by the minimum intra mode prediction bit calculator 500 of FIG. 6. Step (f) may be performed according to conventional art, but, in order to further reduce the amount of calculation, motion estimation and motion compensation between the pixel values of the same frame may be performed only for a luminance frame formed according to luminance component pixel values and not for a chrominance frame formed according to chrominance component pixel values, to calculate a prediction bit value for the intra mode using the minimum division block.

Alternatively, the step of updating the linear parameters may be further included. The update of a linear parameter may be made in macroblock units for which steps (c) to (g) are performed once. However, since it is preferable that the same linear parameter is applied while one frame is being processed, it is better to update the linear parameter after processing one frame.

Lastly, operation of the linear feedback calculator 460, which is an important part of the present invention, will be described in detail below.

In order to calculate an RD value as described above, the linear, feedback calculator 460 must estimate block-specific prediction bit values very accurately.

The linear feedback calculator 460 uses as an input a DCT value obtained during a motion compensation process, or the average and variance of errors which are information corresponding to the DCT value, and so on. The linear feedback calculator 460 stores parameters corresponding to the input value and calculates a prediction bit value by linearly or non-linearly combining the input value with a stored linear parameter.

When the estimation is continued while a parameter is being corrected by taking an error between the calculated prediction bit value and an actual prediction bit value as a parameter compensation value, it is possible to estimate a prediction bit value having a minimum error. FIG. 7 is a conceptual diagram illustrating such an operation. In FIG. 7, an input is the averages and variances of block errors in luminance and chrominance components, a parameter is denoted by a value corresponding to the input, an input stochastic vector is denoted by X, and a linear parameter vector is denoted by P.

The principal of operation of the linear feedback calculator 460 will be described in detail with reference to formulas and input examples.

The motion estimators 411 to 414 in the linear prediction bit estimator 400 calculate errors (errors between blocks) between pixels of macroblocks divided from the current frame data and pixels of a window region defined by the moving vector of the current frame.

When a luminance component is denoted by Y and a chrominance component is denoted by UV, the average of inter-block errors of luminance components calculated by the stochastic value calculator 471 to 474 is $E_{dY}$, and the average of errors of chrominance components is $E_{dUV}$. In addition, a inter-block variance of luminance components is denoted by $\sigma_{dY}$, a variance of chrominance components is denoted by $\sigma_{dUV}$, an input vector having them as its components is $X=(E_{dY}, E_{dUV}, \sigma_{dY}, \sigma_{dUV})$, and a parameter vector corresponding to the input vector is $P=(P_1, P_2, P_3, P_4)$.

Here, parameters are classified according to block modes, thereby obtaining 6 parameter sets of P16×16, P16×8, P8×16, P8×8, I16×16 and I4×4. Thus, a parameter is presented in a 6×4 matrix form. When the P16×6 mode is given as the optimum block mode, an input vector with respect to the mode is $X=(E_{dY}, E_{dUV}, \sigma_{dY}, \sigma_{dUV})$, a parameter is $P=(P_1, P_2, P_3, P_4)$, and a fixed value corresponding to the header information of the corresponding block mode is b, the linear prediction bit value Y is defined by Formula 1.

$$Y = X \cdot P^T + b \quad \text{Formula 1}$$

In Formula 1, Y denotes a linear prediction value of a rate value for RD value calculation. When a rate value actually obtained by the motion compensation process is denoted by $Y_R$, an error value $E_\epsilon$ is defined by Formula 2.

$$E_\epsilon = Y_R - Y \quad \text{Formula 2}$$

It is an object to adjust a parameter to minimize the error value $E_\epsilon$ defined by Formula 2. Thus, when a target function is set to $E_\epsilon^2$, a parameter is updated by calculating the parameter in the steepest descent direction according to Formula 3.

$$\hat{P} = P - t \cdot \frac{\partial E_\epsilon^2}{\partial P} \quad \text{Formula 3}$$

In Formula 3, t is an adaptive gain calculated according to the stochastic Armijo's rule. The updated parameter $\hat{P}$ is substituted by P in the next part and used as a parameter for the next input to predict a rate value.

The linear prediction value of the rate value obtained by the process is used to calculate an RD value according to Formula 4.

$$RD = SAD + \lambda Y_n \quad \text{Formula 4}$$

An initial linear prediction bit estimation operation for the current frame data is performed by applying an initial value to the linear parameter P. For example, initial values may be the same fixed value of about 20, any values between 10 and 20, or determined by referring to previous encoding results.

As described above, when a Lagrangian Multiplier λ is formed using the linearly estimated rate value Y and a previously calculated sum of absolute difference (SAD) or sum of squared difference (SSD) value, a desired RD value is obtained. Here, the coefficient λ is for translating the bits (or rate R) which is generated from encoding, to the domain of the distortion D. Thus, it is possible to perform RDO without directly performing motion compensation, so that the amount of H.264 encoding calculation can be remarkably reduced.

According to the apparatus and method for compression-encoding a moving picture described above, it is possible to minimize the amount of calculation while efficiently performing RDO in moving picture compression-encoding operation.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. An apparatus for compression-encoding a moving picture, comprising:
    a micro-processor;
    a B-slice checker for performing a B-slice check for current frame data;
    a maximum inter mode prediction bit calculator for performing motion estimation and motion compensation for an inter mode using a maximum division block and calculating a prediction bit value;
    a minimum intra mode prediction bit calculator for performing motion estimation and motion compensation for an intra mode using a minimum division block and calculating a prediction bit value;
    a linear prediction bit estimator for calculating prediction bit values for modes other than the inter mode using the maximum division block and the intra mode using the minimum division block, using linear parameters and stochastic values;
    a mode determiner for comparing the prediction bit values calculated by the maximum inter mode prediction bit calculator, the minimum intra mode prediction bit calculator and the linear prediction bit estimator, and determining an appropriate encoding mode; and
    an encoder for encoding the current frame data in the mode determined by the mode determiner.

2. The apparatus of claim 1, wherein the B-slice checker performs a B-slice check for only luminance component data among the current frame data.

3. The apparatus of claim 1, wherein the maximum inter mode prediction bit calculator performs motion estimation and motion compensation for only luminance component data among the current frame data.

4. The apparatus of claim 1, wherein the minimum intra mode prediction bit calculator performs motion estimation and motion compensation for only luminance component data among the current frame data.

5. The apparatus of claim 1, wherein the linear prediction bit estimator comprises:
    a motion estimator for performing motion estimation for respective modes other than the inter mode using the maximum division block and the intra mode using the minimum division block;
    a stochastic value calculator for calculating mode-specific averages and variances of luminance errors and mode-specific averages and variances of chrominance errors from mode-specific motion estimation results of the motion estimator; and
    a linear prediction bit calculator for calculating mode-specific linear prediction bit values using mode-specific linear parameters, mode-specific averages and variances of luminance errors, and mode-specific averages and variances of chrominance errors.

6. The apparatus of claim 5, wherein the linear prediction bit calculator comprises:
    a linear calculator for calculating linear prediction bit values using the linear parameters, the averages and variances of the luminance errors, and the averages and variances of the chrominance errors;
    a subtracter for calculating errors between the calculated linear rate-distortion (RD) values and actual linear prediction bit values output from the encoder;
    a parameter updater for calculating update values of the linear parameters using the errors of the linear prediction bit values; and
    a parameter storage for storing the updated parameters.

7. The apparatus of claim 6, wherein the linear calculator calculates linear prediction bit values according the following formula:

$$Y = X \cdot P^T + b,$$

wherein X denotes an input vector $(E_{dY}, E_{dUV}, O_{dY}, O_{dUV})$, and P denotes a parameter vector $(P_1, P_2, P_3, P_4)$.

8. The apparatus of claim 7, wherein the subtracter calculates errors according the following formula:

$$E_\epsilon = Y_R - Y.$$

9. The apparatus of claim 8, wherein the parameter updater calculates update values of the linear parameters according the following formula:

$$\hat{P} = P - t \cdot \frac{\partial E_\varepsilon^2}{\partial P}.$$

10. The apparatus of claim 1, wherein the mode determiner determines compensation costs according the following formula:

$$RD = SAD + \lambda Y_n,$$

wherein, $\lambda$ is a coefficient for translating the bits (or rate R) which is generated from encoding, to the domain of the distortion D.

11. A computer implemented method of compression-encoding a moving picture, comprising the steps of:
   (a) performing by a micro-processor a B-slice check for input current frame data;
   (b) performing motion estimation and motion compensation for an inter mode using a maximum division block, and calculating a prediction bit value;
   (c) performing motion estimation for inter modes other than the mode using the maximum division block and intra modes other than a mode using a minimum division block;
   (d) applying linear parameters to the motion estimation result of step (c) and calculating mode-specific prediction bit values;
   (f) performing motion estimation and motion compensation for the intra mode using the minimum division block and calculating a linear prediction bit value;
   (g) comparing the linear prediction bit values with each other and determining an optimum mode; and
   (h) encoding the current frame data in the determined optimum mode.

12. The computer implemented method of claim 11, wherein in step (a), a B-slice check is performed for only luminance component data among the current frame data.

13. The computer implemented method of claim 11, wherein in step (b), motion estimation and motion compensation are performed for only luminance component data among the current frame data.

14. The computer implemented method of claim 11, wherein in step (f), motion estimation and motion compensation are performed for only luminance component data among the current frame data.

15. The computer implemented method of claim 11, wherein in step (d), calculating mode-specific prediction bit values comprises the steps of:
   (d1) calculating mode-specific averages and variances of luminance errors and mode-specific averages and variances of chrominance errors from mode-specific motion estimation results of step (c); and
   (d2) calculating mode-specific linear prediction bit values using the mode-specific linear parameters, the mode-specific averages and variances of luminance errors, and the mode-specific averages and variances of chrominance errors.

16. The computer implemented method of claim 15, wherein in step (d2), linear prediction bit values are calculated by the following formula:

$$Y = X \cdot P^T + b,$$

wherein X denotes an input vector $(E_{dY}, E_{dUV}, 0_{dY}, 0_{dUV})$, and P denotes a parameter vector $(P_1, P_2, P_3, P_4)$.

17. The computer implemented method of claim 16, wherein in step (g), RD values are determined by the following formula:

$$RD = SAD + \lambda Y_n,$$

wherein, $\lambda$ is a coefficient for translating the bits (or rate R) which is generated from encoding, to the domain of the distortion D.

18. The computer implemented method of claim 16, further comprising the step of:
   (i) updating the linear parameter according to calculation data of step (h).

19. The computer implemented method of claim 17, wherein in step (i), an update value of the linear parameter is calculated by the following formulae:

$$\hat{P} = P - t \cdot \frac{\partial E_\varepsilon^2}{\partial P}$$

and $$E_\varepsilon = Y_R - Y.$$

* * * * *